US010393406B2

(12) United States Patent
Lesage et al.

(10) Patent No.: US 10,393,406 B2
(45) Date of Patent: *Aug. 27, 2019

(54) ELECTRICAL WATER HEATER WITH A DUAL RESISTIVE HEATING ELEMENT AND A CONTROL METHOD FOR ENERGY MANAGEMENT

(71) Applicant: MICLAU-S.R.I. INC., Montreal-East (CA)

(72) Inventors: Claude Lesage, Pointe Claire (CA); Jean-Claude Lesage, Kirkland (CA)

(73) Assignee: Claude Lesage, Pointe Claire, Quebec ( * ) Notice: Subject to any disclaimer, the term of this patent is extended or adjusted under 35 U.S.C. 154(b) by 3 days.

This patent is subject to a terminal disclaimer.

(21) Appl. No.: 15/732,713

(22) Filed: Dec. 19, 2017

(65) Prior Publication Data
US 2018/0119992 A1 May 3, 2018

Related U.S. Application Data

(62) Division of application No. 14/121,995, filed on Nov. 13, 2014, now Pat. No. 9,885,498.

(51) Int. Cl.
*F24H 1/18* (2006.01)
*F24H 9/20* (2006.01)
*H05B 1/02* (2006.01)
*G05D 23/19* (2006.01)

(52) U.S. Cl.
CPC .......... *F24H 9/2021* (2013.01); *F24H 1/185* (2013.01); *G05D 23/1934* (2013.01); *H05B 1/0283* (2013.01); *F24H 2250/02* (2013.01)

(58) Field of Classification Search
None
See application file for complete search history.

(56) References Cited

U.S. PATENT DOCUMENTS 3,249,740 A * 5/1966 Kinsella, Jr. .......... F24H 9/2021
219/486
4,948,948 A * 8/1990 Lesage .................. F24H 9/2021
392/454
5,808,277 A * 9/1998 Dosani ................ F24D 17/0073
219/481

(Continued)

*Primary Examiner* — Joseph M Pelham
(74) *Attorney, Agent, or Firm* — Guy J. Houle; Houle Patent Agency Inc.

(57) ABSTRACT

An electrical water heater adapted for energy management and a method of controlling the consumption of electrical power from the power supply grid of a utility is described. The bottom resistive heating element of the water heater is a dual element resistive heating element which has a high power rated resistive heating element to heat water and a further low power rated resistive heating element. The power rating of the low power resistive heating element is calculated to be lower than the supply grid diversified mean load. A controller has a communication link with a utility which manages the power supply grid. The utility can control the resistive heating elements of the dual element in such a way, and depending on conditions of the grid, to conserve energy and regulate its frequency thereby resulting in a cost saving to the consumer and the utility. The low power rated resistive heating element is also connectable to an alternative power source.

4 Claims, 3 Drawing Sheets

(56) References Cited

U.S. PATENT DOCUMENTS

| | | | | |
|---|---|---|---|---|
| 6,075,923 | A * | 6/2000 | Wu | F24H 9/2021 |
| | | | | 392/451 |
| 8,204,633 | B2 * | 6/2012 | Harbin, III | F24D 19/1051 |
| | | | | 219/483 |
| 9,885,498 | B2 * | 2/2018 | Lesage | F24H 9/2021 |
| 2008/0107409 | A1 * | 5/2008 | Lesage | F24H 1/202 |
| | | | | 392/454 |
| 2013/0193221 | A1 * | 8/2013 | Buescher | F24H 9/2021 |
| | | | | 237/8 A |
| 2013/0266300 | A1 * | 10/2013 | Kreutzman | H05B 3/82 |
| | | | | 392/501 |
| 2014/0037275 | A1 * | 2/2014 | Flohr | H02J 3/14 |
| | | | | 392/464 |
| 2014/0105584 | A1 * | 4/2014 | Flohr | F24H 9/2021 |
| | | | | 392/441 |
| 2014/0153913 | A1 * | 6/2014 | Newman | F24D 19/1057 |
| | | | | 392/451 |
| 2014/0265573 | A1 * | 9/2014 | Kreutzman | F24H 1/0018 |
| | | | | 307/31 |
| 2016/0138813 | A1 * | 5/2016 | Rimpler | F24D 17/0068 |
| | | | | 392/454 |
| 2016/0216007 | A1 * | 7/2016 | Harbin, III | H02J 13/0006 |
| 2018/0106501 | A1 * | 4/2018 | Hinton | F24H 9/2021 |
| 2018/0238563 | A1 * | 8/2018 | Stepa | F24D 19/1057 |

* cited by examiner

ELECTRICAL WATER HEATER WITH A DUAL RESISTIVE HEATING ELEMENT AND A CONTROL METHOD FOR ENERGY MANAGEMENT

This is a divisional application of U.S. patent application Ser. No. 14/121,995 filed on Nov. 13, 2014 and entitled Electrical Water Heater With a Dual Resistive Heating Element and a Control Method for Energy Management.

TECHNICAL FIELD

The present invention relates to electrical water heaters adapted for energy management and a control method for effective consumption of electrical power from the power supply grid of a utility supplier.

BACKGROUND OF THE INVENTION

Electric water heaters are provided to deliver hot water for domestic or commercial use and such typically is comprised of a steel tank provided with resistive heating elements which are turned on and off as hot water is used or the water heater is in a stand-by state. Thermostats are used to sense the temperature of water in the tank and as hot water is drawn out the cold water is introduced, usually in the bottom of the tank, and this causes a temperature change in the water in the tank and which is detected by the thermostats as the water temperature drops below the set point temperature value of the thermostat sensors. This change in water temperature causes power to be connected to the resistive heating elements until the water heats to a preset temperature value which is sensed by the thermostat which then cut-off the supply to the heating elements.

Demand for hot water, and hence power from the grid supplying the power, typically occurs in predetermined cycles when there is a common need for people to use hot water and this being between 6:00 a.m. to 9:00 a.m. and 6:00 p.m. to 9:00 p.m. which periods are commonly referred to as peak demand periods. The load on the power supply grid is also maxed during these peak demand periods and consequently the cost to produce electricity during such periods is high has is the cost to the consumer. Various methods have been developed in an attempt to save energy and minimize costs to the consumer and the utility providing the power from a power grid that it controls.

One known method is to use programmable timers to control the connection of power to the resistive heating elements and this being done usually during non-peak periods where the cost of the energy is at its lowest. Three element water heaters are known wherein each of the resistive heating elements are automatically controlled during predetermined time periods of a day outside the peak electrical demand hours whereby to cut down on the power demand by the water heater during peak periods. The resistive heating elements of such water heaters usually have different power ratings. Such water heaters also have a pre-programmed control circuit which operates the resistive heating elements regardless of the condition of the electrical power grid supplying the water heaters with power. Reference is made to U.S. Pat. No. 4,948,948 which relates to a water heater with multiple heating elements having different power ratings and operated by a control/timer circuit which operates switches to switch the elements on an off during programmed times in a day. Reference is also made to U.S. Pat. No. 7,620,302 which also relates to a three element high efficiency domestic hot water heater wherein the middle element is disposed at a level which is calculated at approximately an average maximum water consumption volume drawn during a peak power demand time period and slightly above mid-level to provide a better supply volume of hot water.

Another method is to provide a high temperature water heater equipped with a mixing valve to mix the very hot water from the tank with the water from the domestic supply and thus resulting in an effective increase in the hot water capacity that can be delivered without increasing the size of the tank.

Another approach is to shut-off the entire water heater for a predetermined time during peak periods and such as not proved to be successful as the consumer may run out of hot water due to heat loss and use of hot water causing the water in the tank to cool down during the peak periods and waiting for the non-peak periods to be heated. Such an approach would require a large tank and added cost and also a need for more space for installation and further require consumer adaptation and change of the usual custom of use.

In view of the above, a need exists to provide an electric water heater and a method which is adapted for energy management and which is efficient in reducing power consumption from the power supply grid and which is also controllable by the utility to control the power demands on its power supply grid and allow it to also regulate its load frequency. There is also a need to retrofit some existing water heaters to adapt to such energy management at minimal cost.

SUMMARY OF THE INVENTION

It is a feature of the present invention to provide an electric water heater adapted for energy management and a method of controlling the consumption of energy from a power supply grid of a utility which provides the above-mentioned existing need and overcomes the above known disadvantages of the prior art.

Another feature of the present invention is to provide a three element electrical water heater having a fourth low power rated resistive heating element, and particularly but not exclusively, mounted on a common support as the bottom resistive heating element of a three element water heater and wherein such fourth element may be controlled by a utility through a communication link with a controller.

Another feature of the present invention is to provide a dual resistive heating element for use with an electric water heater and wherein one of the two elements is a low power rated element and wherein such dual resistive heating element may be used as a retrofit onto existing two or three element electric water heaters to convert such to an energy manageable water heater.

Another feature of the present invention is to provide a method of controlling the consumption of electrical power from a power supply grid of a utility by the use of a three element water heater adapted with the above mentioned dual resistive heating element.

A further feature of the present invention is to provide a method of controlling the consumption of electrical power from a power supply grid of a utility by incorporating in an electrical water heater a dual resistive element wherein one of its element has a power rating lower than the supply grid diversified mean load.

Another feature of the present invention is to provide a dual heating element in a two or three element electric water heater and wherein a low power rated one of the dual elements is connectable to an alternate power source to reduce demand from the grid and wherein said alternate power source may be engaged by the utility through its communication link with the controller or by the user through a user interface locally or remotely.

According to the above features, from a broad aspect, the present invention provides a three element electrical water heater for energy management. The water heater has a water storage tank having a first resistive heating element secured in a top portion of the tank. A second resistive heating element is secured in a mid-portion of the tank and third resistive heating element is secured in a bottom portion of the tank. Each of the elements have a power rating to heat water in their respective portions of the tank. A thermostatic control is associated with each of the elements. A power source is connected to the thermostatic controls for supplying current to the resistive heating elements. A fourth resistive heating element is provided in the bottom portion of the tank and has a power rating lower than the supply grid diversified mean load. A controller selectively operates the third and fourth resistive heating elements. A communication link is provided between the controller and the utility managing a power supply grid from which the power source originates. The utility provides command signals to the controller through the communication link to enable selected ones of the third and fourth resistive heating elements based on grid load conditions.

According to another broad aspect of the present invention there is provided a three element electrical water heater for energy management. The water heater has a water storage tank with a high power rated top and middle resistive heating element and a bottom dual resistive heating element. The bottom dual resistive heating element has a high power rated resistive heating element and a low power rated resistive heating element. A controller is provided for selectively operating the two resistive heating elements of the dual element. A communication link is provided between the controller and a utility managing a power supply grid from which the resistive element are supplied power. The utility provides command signals to the controller through the communication link to enable selected ones of the heating elements of the dual heating element based on grid load conditions.

According to a still further broad aspect of the present invention there is provided a dual resistive heating element for use in an electrical water heater. The dual resistive heating element is comprised of an electrically insulated mounting support for connection to a heating element port of a water holding tank of the electrical water heater. The mounting support supports a first and a second resistive heating element secured in an electrically insulated manner and in a spaced-apart relationship. The second resistive heating element has a power rating much inferior to the first resistive heating element and lower than the supply grid diversified mean load. External electrical connectors are secured to an outer surface of the support for connection to the electrical supply.

According to another broad aspect of the present invention there is provided a method of controlling the consumption of electrical power from a power supply grid of a utility by an electric water heater. The method comprises providing a water heater with a water holding tank having three resistive heating elements mounted therein. Each resistive heating element is mounted in a respective one of a top, middle and bottom portion of the water holding tank. The resistive heating element mounted in the bottom portion of the tank is a dual resistive heating element with one of its dual elements has a power rating lower than the supply grid diversified mean load. The method also comprises independently controlling both heating elements of the dual resistive heating element during non-peak and peak consumption periods of the power grid to minimize consumption from the power supply grid.

According to a still further broad aspect of the present invention there is provided a method of controlling the consumption of kilowatts by an electrical water heater from a power supply grid of an electric utility. The method comprises providing a three element water heater with the resistive heating elements mounted in the water holding tank of the water heater. A first of the heating element is mounted in a top portion of the tank. A second of the heating elements is mounted in a mid-portion of the tank. A third of the resistive heating elements is mounted in a bottom portion of the tank. A fourth resistive heating element is mounted in the bottom portion of the tank and has a much lower power rating than the other elements. Its power rating is lower than the diversified mean load of the supply grid. A programmable controller has a communication link with a utility managing the power supply grid and operates at least the third and fourth resistive heating elements to perform one of the following, namely, (a) enabling one or both the third and fourth resistive heating elements during low power demand period of the power supply grid during normal grid conditions, (b) disabling one or both the third and fourth resistive heating elements during daily peak demand periods of the power supply grid where the first and second resistive heating elements are enabled, (c) activating the fourth resistive heating element at start-up after a down time of the power grid until the grid stabilizes and thereafter progressively actuating the other resistive heating elements, and (d) connecting the fourth resistive heating element to an alternative power source.

According to another broad aspect of the present invention there is provided a retrofit dual resistive heating element for use in an electric water heater for power management of the water heater by control means. The dual resistive heating element is comprised of an electrically insulated mounting support for replacement connection to an existing resistive heating element port of a water holding tank of the water heater. The mounting support, supports a first and a second resistive heating element in an electrically insulated supported manner with the elements disposed in a spaced-apart relationship. The second resistive heating element has a power rating lower than the diversified mean load of the supply grid and the first resistive heating element. External electrical connectors are secured to an outer surface of the support for connection to an electrical power supply.

Another broad aspect of the present invention is to provide an electrical water heater having two or three resistive heating elements mounted within a water holding tank thereof. One of the resistive heating elements is a dual resistive heating element having a first high power rated resistive heating element and a second resistive heating element having a power rating lower than the supply grid diversified mean load.

A still further broad aspect of the present invention is to provide a method of operating a heating element of an electric water heater during a power shut-off period of a power supply grid. The method comprises providing a water heater with a water holding tank having a dual resistive heating element mounted therein with one of the dual elements having a power rating lower than the diversified mean load of the power supply grid. An alternative power supply source is connected to the lower power rated resistive heating element through a switch means. The switch means is actuated during the power shut-off period to enable the one of the dual resistive heating elements to heat water in the water holding tank.

According to another broad aspect of the present invention there is provided a method of controlling the consumption of kilowatts by an electrical water heater from a power supply grid on an electric utility. The method provides an electrical water heater with two or three resistive heating elements mounted in a water holding tank thereof and wherein on e of the resistive heating elements is a dual resistive heating element having a high and a low power rated heating element. The low power rated heating element has a power rating lower than the diversified mean load of the supply grid. The method provides a programmable controller having a communication link with the utility and/or a user interface to operate at least the low power resistive heating element to reduce the consumption of kilowatts from the supply grid.

DESCRIPTION OF THE DRAWINGS

A preferred embodiment of the present invention will now be described with the examples thereof as illustrated in the accompanying drawings in which.

DESCRIPTION OF THE PREFERRED EMBODIMENT

Figure 1:
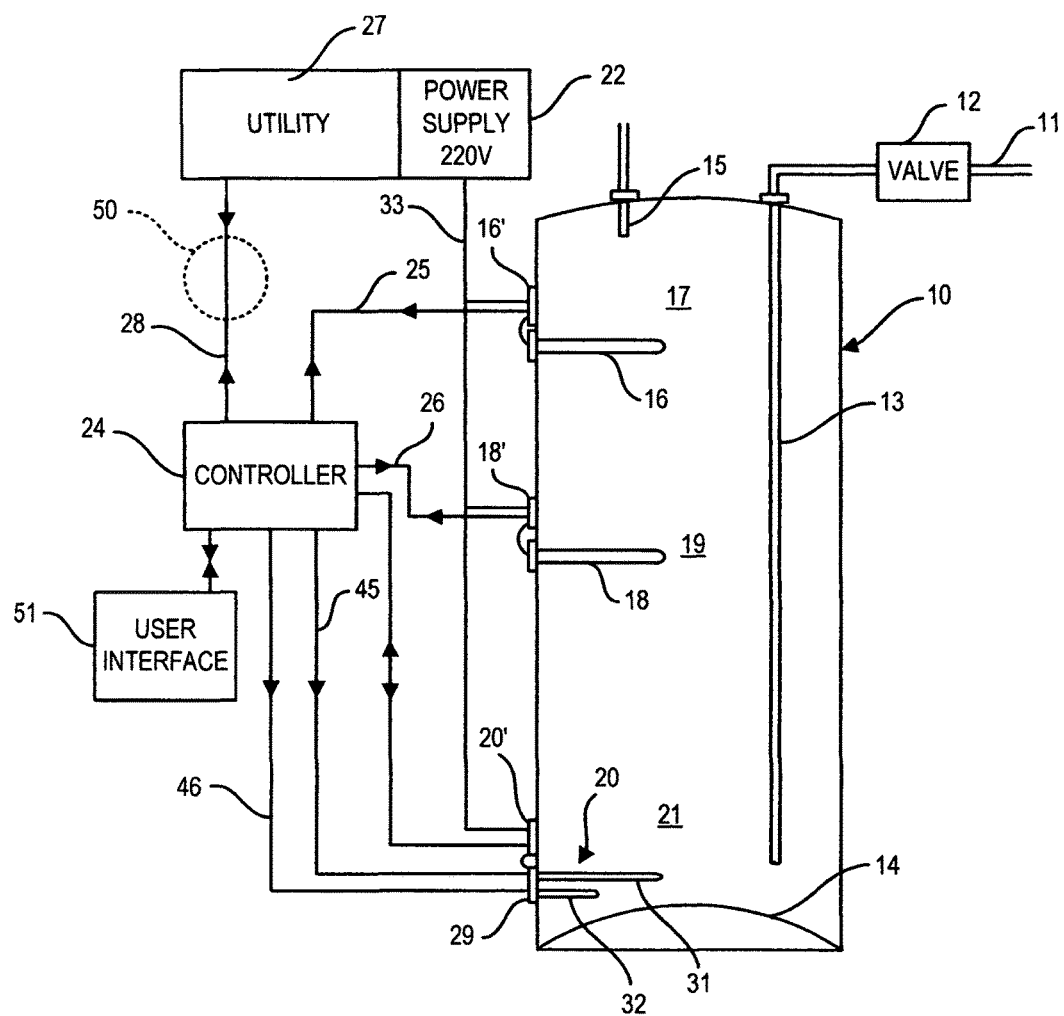
FIG. 1 is a simplified schematic view, partly in block form, of a three element water heater adapted for energy management.

Referring now to the drawings and more particularly to FIG. 1, there is shown a water holding tank 10 of a three element water heater. Such tank is thermally insulated by an insulation contained thereabout between an outer jacket of the tank not shown, but obvious to a person skilled in the art. The water holding tank is fed a supply of domestic water from the domestic supply line 11 usually through a cut-off valve 12 and a dip tube 13 which extends inside the tank and terminated spaced above the bottom wall 14 of the tank. A pipe 15 extends into the top portion of the tank to supply hot water when demanded by the consumer.

As herein shown, a first electrical resistive element 16 is mounted in a top portion 17 of the tank 10. A second electrical resistive heating element 18 is mounted in a mid-portion 19 of the tank. The first and second resistive heating element usually have the same high power rating as will by described below and in accordance with examples of tank volume. A third dual resistive heating element 20 is mounted in the bottom portion 21 of the tank above the bottom wall 14. Thermostatic controls 16', 18' and 20' are associated with each of the resistive heating elements and are connected to the power supply 22 from the power supply grid by a suitable feed cable 33 to provide the 220 volts required to enable the electrical resistive heating elements 16, 18 and 20. These thermostatic controls are also connected to a controller 24 to feed temperature signals thereto and to receive control signals from the controller 24 to enable and disable the resistive heating elements. Usually, the top two resistive heating elements are controlled only by the thermostatic controls which operates the element based on preset temperature conditions of the water temperature in their zone. However, as herein shown the connections 25 and 26 provides for the controller 24 to shut-off one or both of the resistive heating elements 16 and 18 based on the conditions of the power supply grid and has dictated by the utility 27 managing the power supply grid and forwarding command signals to the controller trough a communication link 28 which may be a cable connection or a wireless link. The controller 24 cause the thermostatic controls or other switching devices to perform the switching function as received from the command signals. The controller 24 includes a memory and a microprocessor or CPU operable to execute programming instructions or micro-control code associated with the water heater. As shown in dotted lines, a smart meter 50 may be in the communication link between the utility and the controller 24 to provide remote reporting of consumption data to the utility. Such smart meters are based on open smart grid protocol (OSGP) that has the ability to reduce load and disconnect-reconnect remotely.

Figure 2:
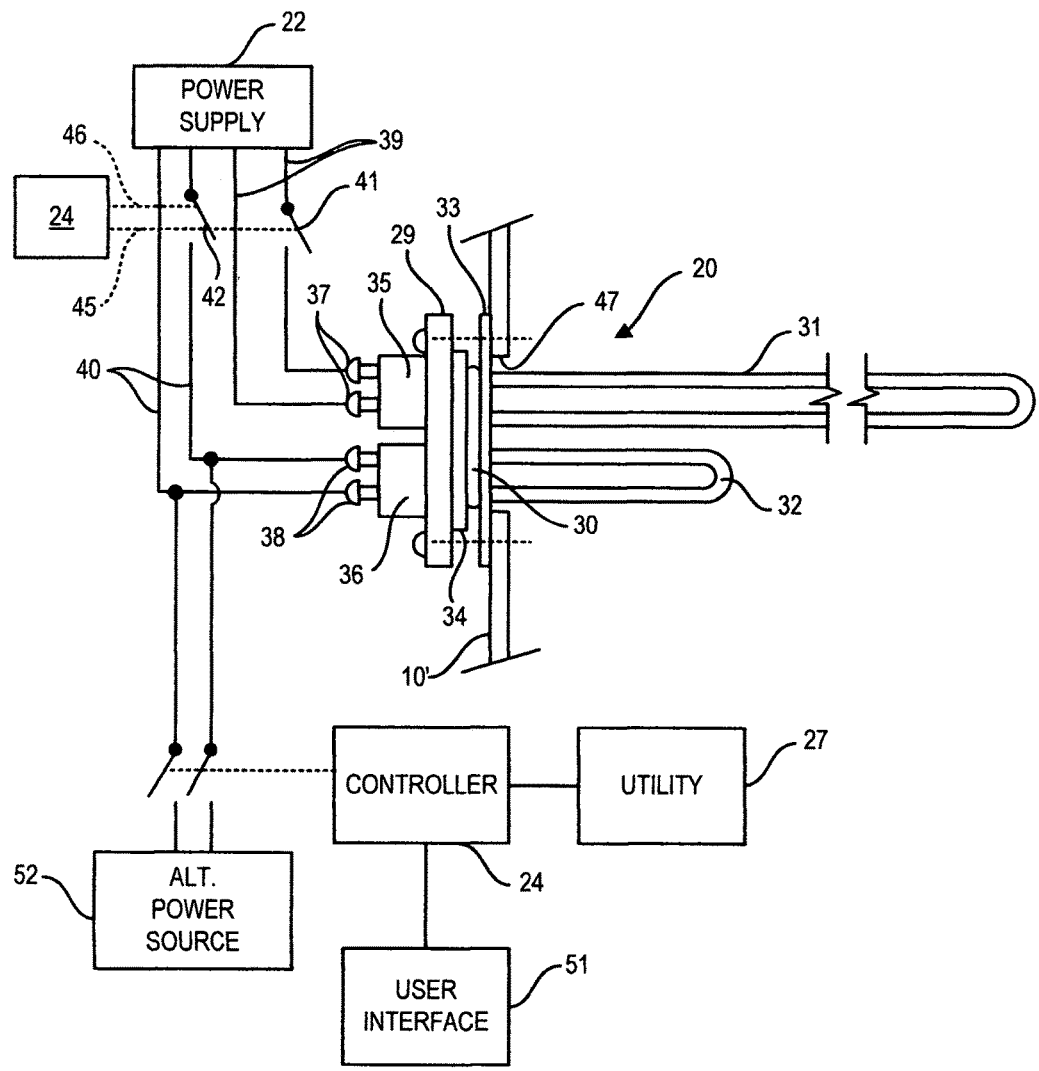
FIG. 2 is a fragmented side view illustrating the construction of the dual heating element having a high and low power rated resistive heating element and its support and mounting in a port at a bottom portion of a water heater tank.

With additional reference to FIG. 2, the dual resistive heating element 20 is comprised of an electrically insulated mounting support, herein a flange 29, onto which is secured a base 30 to which a first high power rated resistive heating element 31 is mounted as well as a much lower power rated resistive heating element 32, usually in the range of about one seventh to one fifth the value of the first resistive heating element 31. The power rating of the element 32 is calculated to be approximately in the range of 400 to 800 watts. Typical examples of the power rating of the resistive heating element is described hereinafter with reference to a few specific volumes of tanks 10. The base 30 is electrically insulated between a pair of dielectric gaskets 33 and 34. Each resistive heating element has a non-conductive mounting block 35 and 36, respectively, provided with connecting bolts 37 and 38, respectively, to which the supply wires 39 and 40, respectively, from the power supply 22 are secured. Suitable switching means 41 and 42, such as relays or other type circuit breakers, are controlled by the programmable controller 24 and also by the command signals from the utility 17 or the user person, to switch these resistive heating elements 31 and 32 "on" and "off" as required for energy management of the water heater.

Typically, as examples only, the power rating of the resistive heating elements for a 60 gallon water tank would consist of the top two resistive heating elements 16 and 18 having a power rating of 4500 watts. The high power resistive heating element 31 of the dual resistive heating element 20 would have a power rating of 3800 watts and the lower power rated element 500 to 800 watts. For a 40 gallon tank the top two elements would have a power rating of 3800 watts, the higher power rated element 31, 3000 watts and lower power rated element 32, 400 to 800 watts.

The controller 24 is a programmable controller and is programmed to effect specific control function with respect to the control of each of the elements 31 and 32 of the dual resistive heating element 20 through its connections 45 and 46 which controls the power supply to the elements as schematically illustrated in FIG. 2. During normal conditions of the power supply grid, the controller operates the dual element water heater 20 automatically. However, the utility can take over control of the water heater during abnormal conditions of the grid or for any other reasons, such as wanting to stop supplying power to a specific user. The programmable controller 24 can enable one or both of the resistive heating elements 32 and 31 during low power demand period of the power supply grid during non-peak hours and normal grid conditions to heat the water in the tank of the water heater with low wattage consumption when electricity is at its lowest cost with the grid having a high capacity to provide power. By heating the water in the tank during non-peak periods, the top two elements 16 and 18 are functioning for a shorter period of time and therefore use less power during peak power demand periods due to a higher temperature of the water in the tank and thus reducing the time demand on the grid and resulting in a cost saving to the user and the utility. At night time, the low power element 32 may be activated to maintain a substantially constant set temperature of the water in the tank. If the heat loss is excessive, for any reason, the other element 31 can be switched "on" automatically by the controller sensing the temperature value signal from the thermostatic control 20'.

During peak demand periods, the controller or utility can disable the dual resistive heating element 20 and only the top and middle heating element are automatically enabled by their thermostatic controls 16' and 18' sufficient only to maintain a supply of hot water to a desired temperature. Thus, by cutting off the bottom dual element which was activated or partly activated during non-peak periods, and heating the water during peak hours by the two top elements, there is less kilowatts consumed and a power saving to the utility as well as a cost saving to the consumer and the utility.

In the event of a problem and a reduction of available power on the power supply grid, the utility can send a command signal to the controller 24 to operate only the low resistive heating element 32 of the water heater until the grid stabilizes and thereafter cause the other elements to be actuated. If the re-actuation is in the peak demand period the utility can control the elements in a desired sequence thereby actuating the high power element 31 of the dual element 20 and thereafter control the mid-level element 18 maintaining the top element 16 deactivated whereby the grid is not overloaded and the frequency of the supply can be regulated. In the event of a major power failure on the grid where the supply of power is completely cut-off, upon restoration the utility would send command signals to create a "soft" start by firstly actuating the low rated resistive heating element 32 of the dual heating element 20 and then progressively actuate the high power rated element 31 and progressively the mid-element 18 and lastly the top element 16 where the hottest water has propagated to. It is to be understood that thousands of such water heaters may be connected to the power supply grid although reference is made herein to a single three element water heater.

Figure 3:
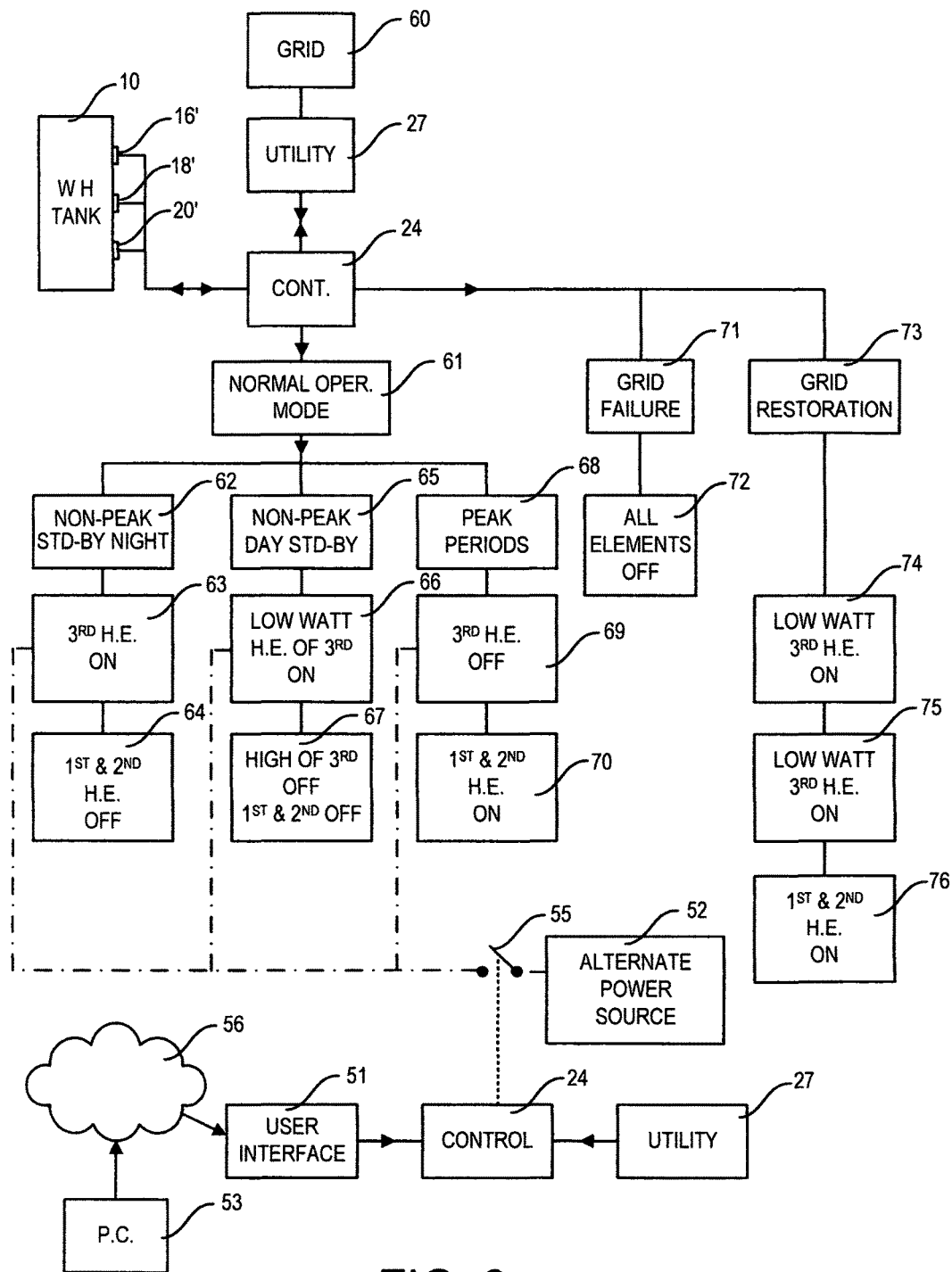
FIG. 3 is a flow chart illustrating the method of controlling the consumption of kilowatts from a power supply grid of an electric utility by a three element water heater configured in accordance with the present invention utilizing a dual resistive heating element mounted in the bottom portion of the water holding tank.

As illustrated in FIGS. 1 to 3, a user interface 51 can be linked to the controller to permit the user to disable the link to the utility or to locally or remotely such as with a PC 53, cause the controller to engage the low power rated resistive heating element 32 to an alternate power source 52 to save on energy consumption or for operating the water heater low resistive heating element during power failure on the grid. The controller may also be linked to a home energy manager in the household.

With reference now to FIG. 3, there is illustrated in block form the operation of the method of controlling the consumption of electrical power from the power grid 60 of the utility 27. As illustrated, during normal operating mode 61 of the grid, the controller 24 is programmed to effect various functions. During non-peak demand night time period 62, which is relatively a long period, from 9:00 p.m. to 6:00 a.m., only the low power rated element 32 of the dual resistive heating element 20 is activated, as depicted by block 63. The element 31 remains de-activated but under certain conditions it could be activated for a short period of time. As depicted by block 64 the top and middle elements are not operating as the water temperature is sufficiently hot due to the operation of the resistive element 32 to prevent them from being turned on.

Also, during the normal operating mode 61, during the non-peak day period depicted by block 65, from 9:00 a.m. to 6:00 p.m., where there is a slight increase in demand, only the low wattage element 32 of the dual resistive heating element is on and all other elements are off, as depicted by blocks 66 and 67. Again the element 31 could be activated should there be an excessive heat loss or sudden demand during that period.

During the peak demand period for power by the water heater, as depicted by block 68, the dual resistive heating element is de-activated as depicted by block 69 and only the top two elements 16 and 18 are activated, as depicted by block 70. This is made possible by managing the dual resistive heating element during non-peak periods and resulting in a power saving by not activating the dual resistive heating element 20 during the peak period resulting in a saving of about 4,300 watts for a 60 gallon tank.

As described above, during a complete grid failure, depicted by block 71 all the elements are obviously "off", as depicted by block 72. After the grid is restored, depicted by block 73, and not to overload the grid 60, the utility has control of the water heaters connected thereto and engages only the low wattage element 32, see block 74. Thereafter, the other element 31 of the dual resistive heating element 20 is switched on, as depicted by block 75. The middle and top resistive heating elements 18 and 16 are switched on at an appropriate time during grid stabilized power distribution, as depicted by block 76. Accordingly, as can be seen by the provision of the dual resistive heating element there is provided an effective energy management of power and a cost saving. Also, the dual resistive heating element facilitates the conversion of existing three element water heaters into energy manageable water heaters at a low retrofit cost to the consumer.

During complete grid failure, the utility 27 can also send a command signal to the controller of all customers equipped with alternative power sources, such as gas generators, wind generators or power cell supply, to enable a circuit breaker 55 to connect the alternative power source 52 to the low power rated resistive heating element 32 to heat water in the water holding tank. The controller 24 may be programmed to effect the switching automatically upon detecting such power failure or be instructed to do so by the user person locally or remotely through a PC 53 in a wireless link, such as the internet 56.

The wording "diversified mean load" of the grid as used herein is defined as the average load in kilowatts per tank as seen by the utility during peak demand periods. The demand is in fluctuation due to the fact that the water heaters in a grid are not all turned on or off at the same time and have different input loads and the mean load as seen by the grid is the average of this load fluctuation.

It is within the ambit of the present invention to provide any obvious modifications of the preferred embodiment described herein provided such modifications fall within the scope of the appended claims.

The invention claimed is:

1. A dual resistive heating element for use in an electrical water heater, said dual resistive heating element comprising an electrically insulated mounting support for connection to a heating element port of a water holding tank of said electrical water heater, said mounting support supporting a first and a second resistive heating element in an electrically insulated supported manner with said elements disposed in a spaced-apart relationship, said first and second resistive heating elements being connected to a common AC power supply through switching means, said second resistive heating element having a power rating lower than said first resistive heating element and in the range of from 400 to 800 watts, and external electrical connectors secured to an outer surface of said support for connection to said AC power supply.

2. The dual resistive heating element as claimed in claim 1 wherein said dual resistive heating element is for use as a bottom resistive heating element in a three resistive heating element electrical water heater.

3. A retrofit dual resistive heating element for use in a three resistive heating element electrical water heater for power management of said water heater by control means, each said three resistive heating elements being mounted independently from one another to a water heater holding tank, said dual resistive heating element comprising an electrically insulated mounting support for replacement connection to an existing resistive element port of said water holding tank of said three element electrical water heater, said mounting support supporting a first and a second resistive heating element in an electrically insulated supported manner with said elements disposed in a spaced-apart relationship, said first and second resistive heating elements being connected to a common AC power supply through switching means, said second resistive heating element having a power rating lower than said first resistive heating element and in the range of from 400 to 800 watts, and external electrical connectors secured to an outer surface of said support for connection to said AC power supply.

4. The retrofit dual resistive heating element as claimed in claim 3 wherein said mounting support is adapted for replaceable connection to said resistive heating element port by means of an adapter.

* * * * *